United States Patent [19]

Ryan

[11] 4,200,301

[45] Apr. 29, 1980

[54] CORE LOCKING DEVICE

[75] Inventor: Ralph L. Ryan, East Hanover, N.J.

[73] Assignee: JRC Products Inc., Boonton, N.J.

[21] Appl. No.: 939,265

[22] Filed: Sep. 5, 1978

[51] Int. Cl.² ............................................. B23B 31/40
[52] U.S. Cl. ................................. 279/2 A; 242/72 B;
269/48.1; 279/1 Q
[58] Field of Search ...................... 279/1 Q, 2 R, 2 A;
82/44; 242/72 B; 134/153; 269/48.1; 24/20 R,
20 TT, 255.5 L

[56] References Cited

U.S. PATENT DOCUMENTS

| 2,160,031 | 5/1939 | Ohme | 134/153 X |
| 3,253,323 | 5/1966 | Saueressig | 279/2 A X |
| 3,901,480 | 8/1975 | Basile et al. | 24/255.5 L X |
| 4,114,909 | 9/1978 | Taitel et al. | 279/2 A X |

*Primary Examiner*—Z. R. Bilinsky
*Attorney, Agent, or Firm*—Gerald Durstewitz

[57] ABSTRACT

An expandable device for locking an annular member to a shaft for rotation therewith in which an annular body mounts on the shaft and carries a plurality of radially moveable bars overlying a single wall annular bladder lying against the surface of the body. The surface of the body is formed with annular raised ridges beneath each end of the bladder. A metal band formed with interlocking ends is secured around each end of the bladder to seal the ends of the bladder to the body.

2 Claims, 7 Drawing Figures

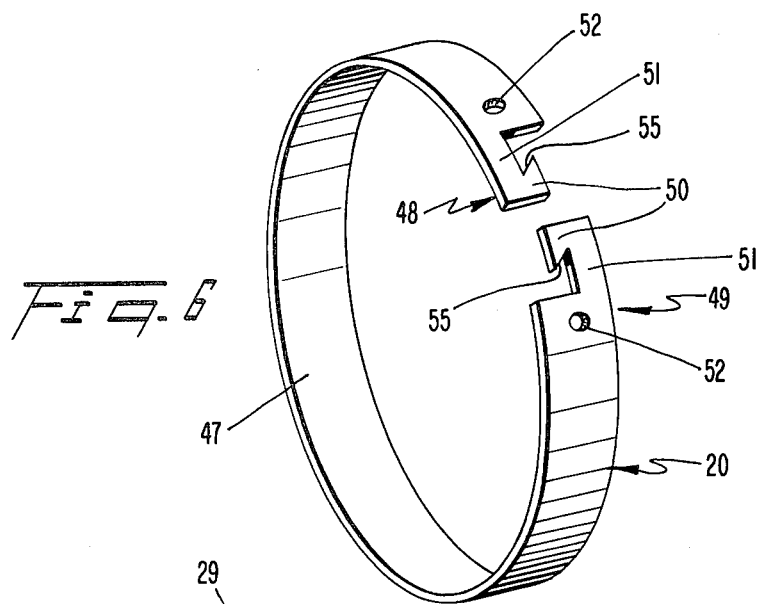
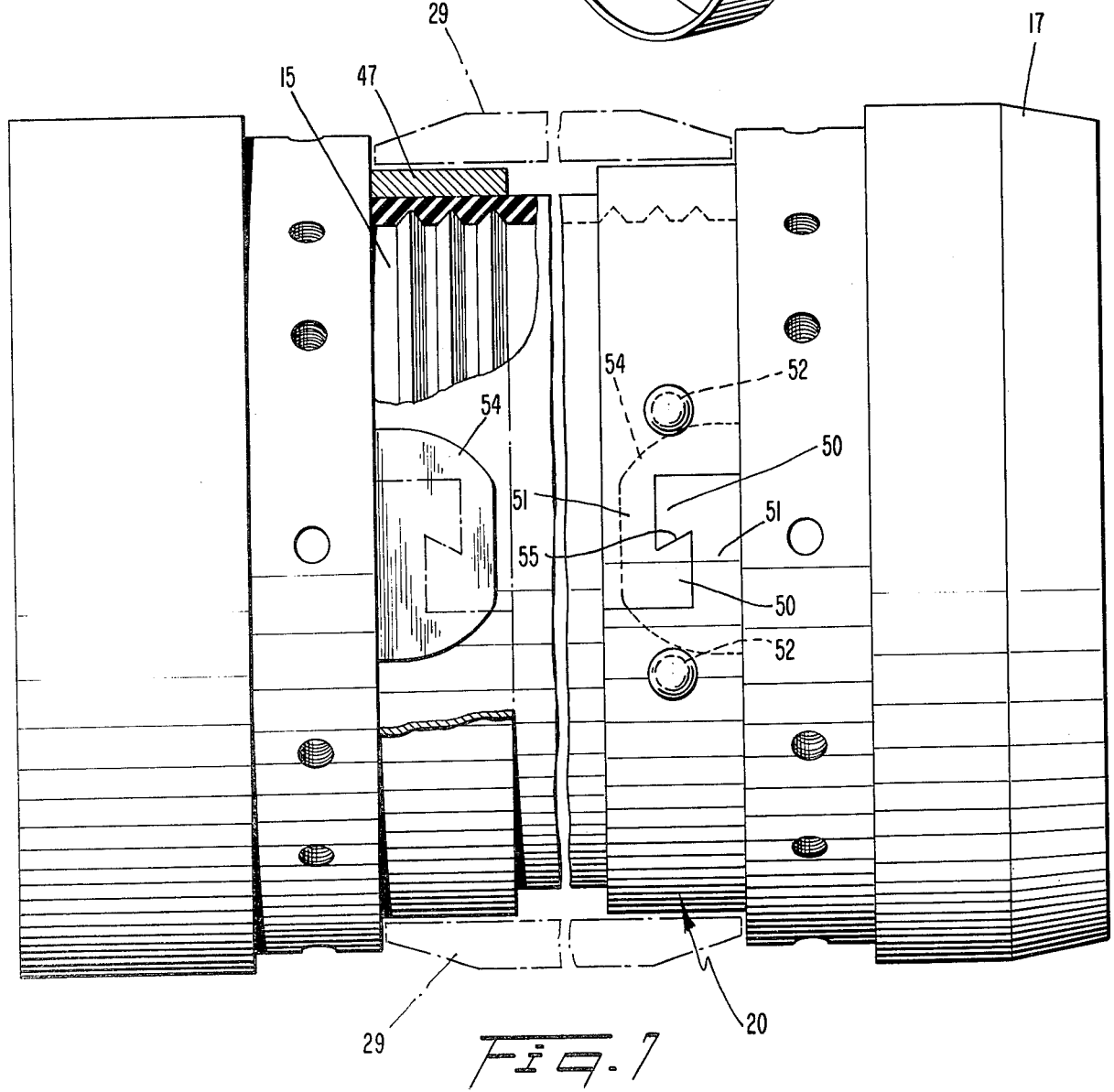

CORE LOCKING DEVICE

BACKGROUND OF THE INVENTION

The present invention relates to devices for transmitting torque between a shaft and a member mounted on the shaft, and, more particularly, to expandable devices for locking a centrally bored core type member to a shaft element.

Paper and plastic web materials utilized in industry for packaging, labeling, and other purposes are supplied in rolls that are wound upon tubular cores. When the rolls are being wound and unwound, the cores are mounted on shafts that are journalled in bearings and are either driven or restrained (by a braking arrangement) usually in a manner such that the web is under constant tension. Expanding devices commonly referred to as "air chucks" or "air shafts" are normally used to lock the core to the journalled shaft so that the web rolls rotate with the shaft as a unit. The term "air chuck" is normally used to designate a short device which is locked to a shaft by set screws and can be used alone to secure a narrow roll or can be used as one of a pair to secure a wide roll. In the latter instance, the chucks are spaced on the shaft so as to engage the ends of the core of the wide roll. The term "air shaft" normally is used to designate a longer device which is essentially an elongated air chuck constructed with an integral shaft. A shaft portion extends from each end of the air shaft. The "air shaft" is utilized for wide rolls, and, after the roll is slid thereon, the end shaft portions are positioned in the bearings which will support the roll.

The prior art air chucks and air shafts employ some form of double-walled annular inflatable bladder. In the simplest designs the bladders are doughnut-shaped and expand directly against the inner surface of the core. These designs are the least expensive and have the greatest torque transmitting ability since the entire surface of the bladder is in contact with the core. The bladder does not, however, provide a rigid driving connection between the shaft and core and cannot be used effectively with sensitive tension control equipment. In other designs, the bladders are positioned within cylindrical casings which have sections which move radially against the core when the bladder is inflated. The radially moveable sections constitute a relatively small portion of the outer surface of the casing, therefore, only a fraction of the energy stored in the inflated bladder is used to grip the core and the torque transmitting capacity of these devices is limited. These designs are also fairly complex and tend to be relatively expensive to manufacture.

The present invention is an improvement upon the core locking device disclosed in my copending patent application Ser. No. 669,218 filed on Mar. 22, 1976 and assigned to the assignee of the present invention.

The device of the above mentioned copending patent application contains a single-wall annular bladder which lies upon an annular surface of the body of the device. The ends of the bladder are fastened to the body by means of strips of adhesive tape that are wrapped around the bladder under tension to force the bladder into a plurality of upraised annular grooves formed on the body. This sealing arrangement, while initially effective, became unsatisfactory after a period of time. The repeated inflation cycles to which the bladder is subjected caused the adhesive tape to stretch and leakage developed.

SUMMARY OF THE INVENTION

It is, therefore, an object of the present invention to provide an improved expandable device for locking a core to a shaft element.

Another object is to provide such a device which is simple, effective, and inexpensive.

Another object is to provide such a device wherein the ends of the bladder are sealed and held in place by a novel locking arrangement which is simple, inexpensive, and effective.

The foregoing objects are accomplished by providing in an expandable device for locking a bored member to a shaft element, the expandable device having a body member provided an annular surface and an annular single wall expandable bladder covering the annular surface, means for sealing the ends of the bladder to the surface comprising in combination a plurality of parallel circumferential ridges at each end of the annular surface, and a pair of discontinuous circular bands formed with interlocking ends each positioned over one end of the bladder and dimensioned to force the bladder against the ridges when the ends are interlocked.

BRIEF DESCRIPTION OF THE DRAWINGS

Preffered embodiments of the invention have been chosen for purposes of illustration and description, and are shown in the accompanying drawings, forming a part of the specification, wherein:

FIG. 6 is a perspective view of a locking ring according to the present invention; and FIG. 7 is a side view similar to FIG. 1 with the torque transmitting rings and core engaging bars removed to reveal the locking rings.

DESCRIPTION OF THE PREFERRED EMBODIMENTS

Figure 1:
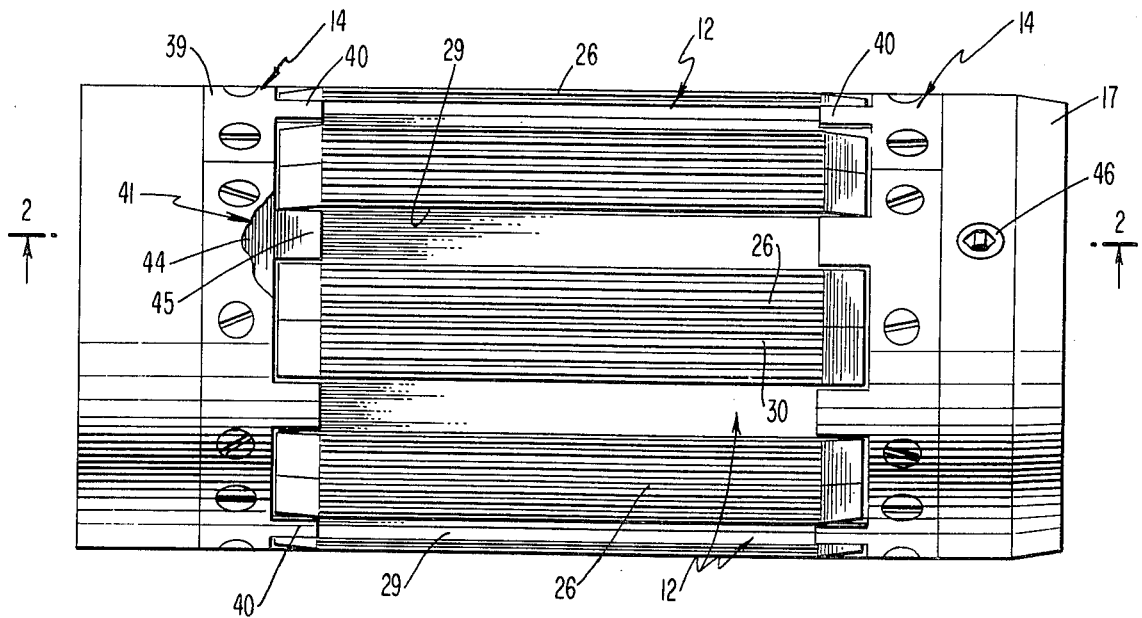
FIG. 1 is a side view of one embodiment of a core locking device containing the present invention.
Figure 2:
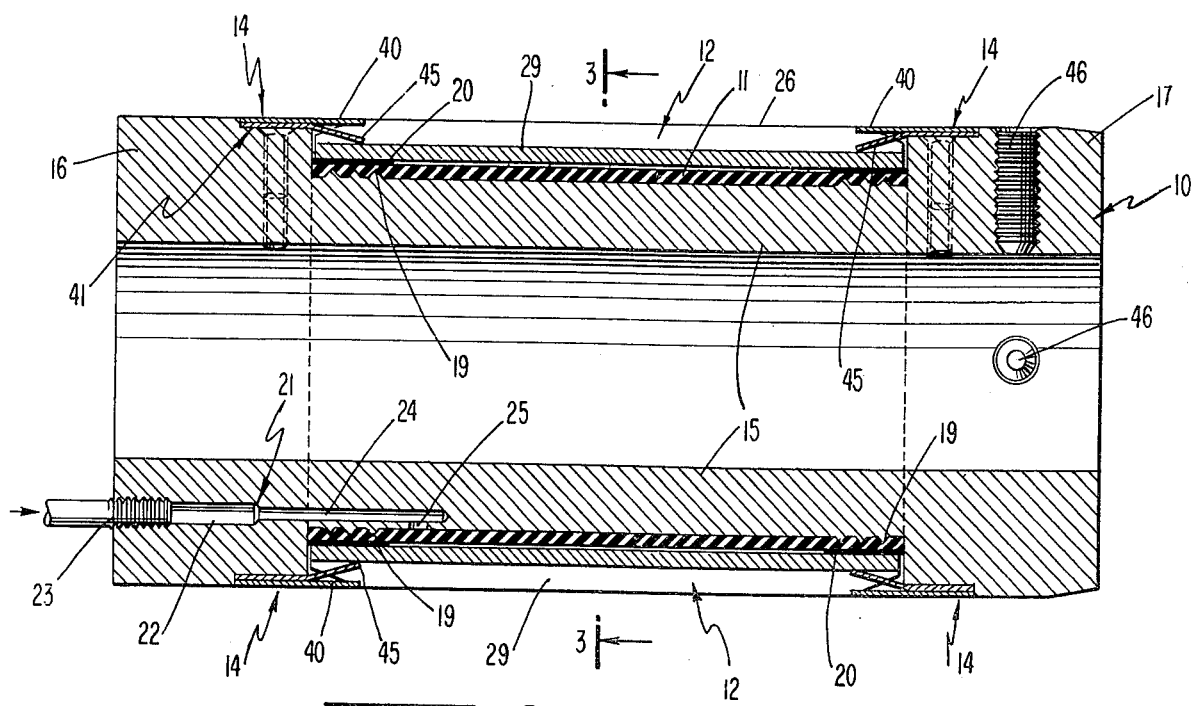
FIG. 2 is a longitudinal sectional view taken along line 2—2 on FIG. 1.

With reference to FIGS. 1 to 4 of the drawings, there is shown an air chuck embodying the present invention which generally comprises an annular body 10, a tubular singlewall bladder 11, eight core-engaging bars 12, and a torque transmitting ring 14 mounted on each end of the body.

The body 10 is formed with a small diameter main section 15 and enlarged end sections 16 and 17. Three parallel circumferential ridges 19 are provided at each end of the main section 15. The bladder 11 is made of an elastic material such as neoprene rubber and is positioned on the main section 15 by sliding it over one of the end sections 16 or 17. A metal locking ring 20 is clamped around each end of the bladder to tightly press the bladder onto the ridges 19 to provide an air-tight seal with the body. A passageway 21 extends from the end wall of the section 16 to the surface of the main section 15 beneath the bladder 11. The passageway includes a stepped bore having a threaded large diameter section 22 and a narrow section 24, and a radial bore 25 which intersects the section 24. An air valve 23 is threaded into the bore section 22.

Figure 3:
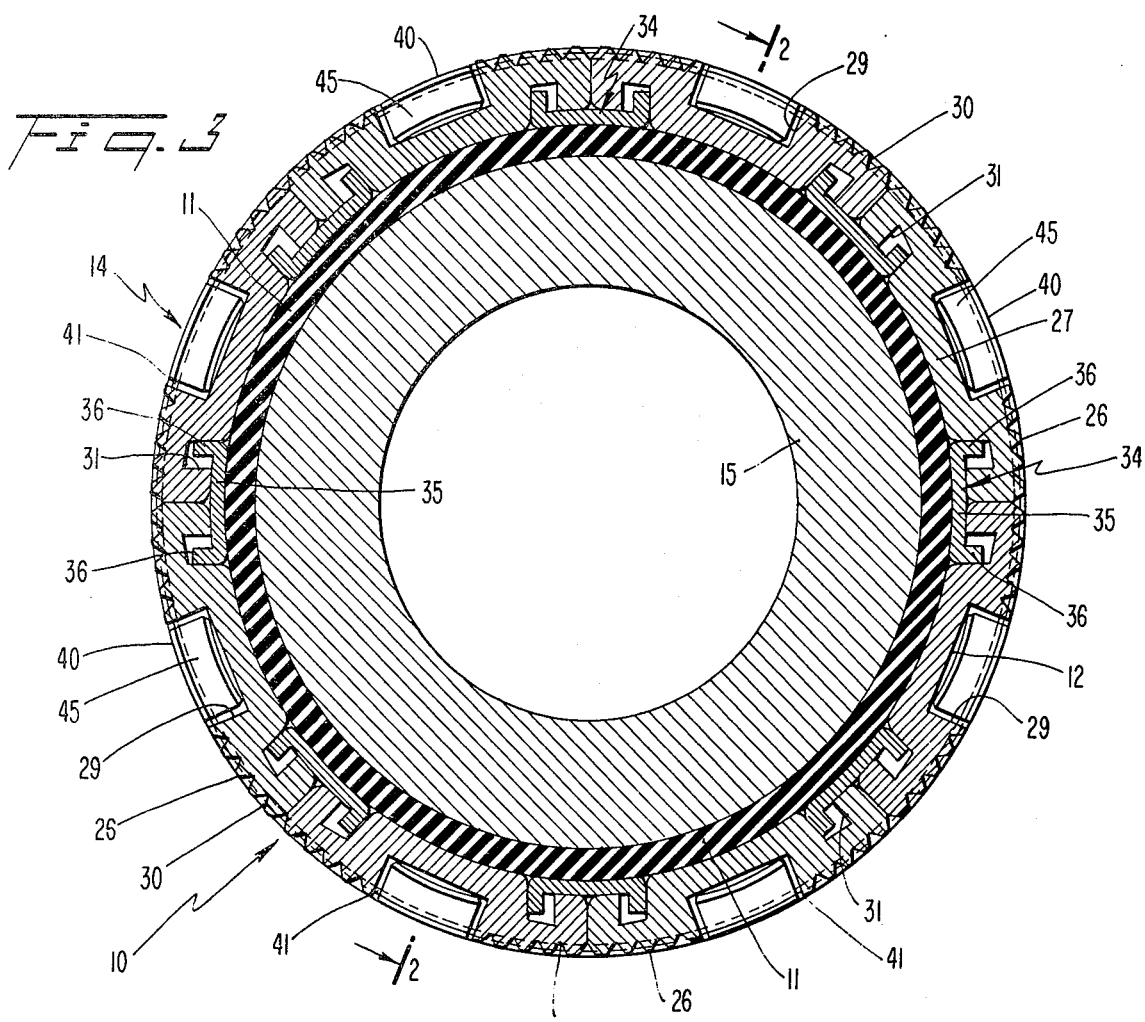
FIG. 3 is a partial transverse sectional view taken along line 3—3 on FIG. 2.

The bars 12 are arcuate in cross-section, as shown in FIG. 3, and are positioned side by side around the circumference of the bladder. Each bar is formed with a pair of longitudinally extending edge portions 26 separated by a thin central portion 27 which defines a longitudinally extending recess 29 at its outer surface. The edge portions 26 are provided with a series of longitudinal "V-shaped" grooves 30 on the outer surface thereof to grip the roll cores. Each of the edge portions 26 also has a rectangular longitudinally extending groove 31 formed in its inner surface. Elongated "U-shaped" link members 34 interconnect adjacent bars. Each link member 34 has a base 35 underlying the edge portions of adjacent bars and lips 36 on each side of the base extending into the adjacent grooves 30. The part of the edge portions 26 which lie between the groove 30 and the edge of the bar is cut away to accommodate the link member 34 so that the inner surface of the link member is flush with the inner surface of the rest of the bar.

The torque transmitting rings 14 each comprise a metal band 39 formed with eight tooth elements 40 extending therefrom into the ends of the recesses 29 in the bars 12. The body sections 16 and 17 are recessed to accept the rings 14 and a spring ring 41 so that the outer surface of each of the rings 14 is flush with the surface of the sections 16 and 17. The rings 14 are clamped to the body 10 by means of machine screws 42 which pass through holes in the band 39 and are threaded into the body portions 16 and 17. The spring rings 41 are formed of thin spring steel material and include a band 44 from which flat fingers 45 extend into the recesses 29 under the teeth 40. The fingers 44 are bent inwardly to contact the bottom of the recesses 29 of each of the bars to urge the bars radially inwardly and thus to retract the bars when the bladder lies against the surface of the section 15. The body 10 is provided with threaded transverse bores to accommodate set screws 46.

Referring now to FIGS. 6 and 7, the locking rings 20 are discontinuous circular metal bands having a body portion 47 and interlocking hook elements 48 and 49 on the ends thereof. Each hook element has a head portion 50 and a neck portion 51 connecting the head portion to the body of the band. The neck and head portions are shaped and sized so that when the hook elements are interlocked, a continuous band of uniform dimension is formed. Aperatures 52 are provided at each end of the body portion 47 to receive the ends of a plier type-tool which is used to force the ring closed, pressing the bladder into the raised ridges. Before each ring 20 is closed, a thin metal plate 54 is placed on the bladder under the interlocking hook ends to protect the bladder in the event that the ring twists at this point as the bladder is inflated. The inner corners of the plate 54 are rounded off to protect the inflated bladder from contacting a corner point. Each hook element has a tension transmitting edge 55 which abutts the edge 55 of the cooperating hook element to hold the ring closed.

Figure 4:
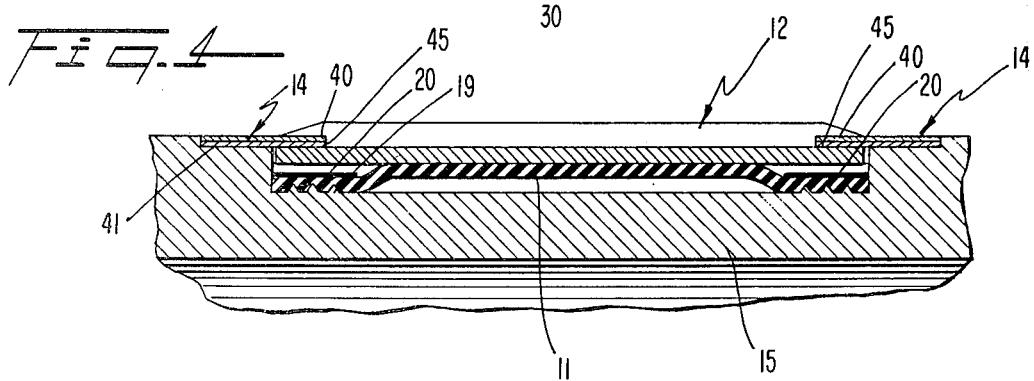
FIG. 4 is a fragmentary sectional view illustrating the device in its operated condition.

In operation, the device is mounted on a shaft and locked thereto by means of the set screws 46. The spring rings 41 hold the bars 12 against the bladder presenting a flush outer surface. The roll core is slid over the body so that it covers the bars 12. An air hose from a source of pressurized air is then applied to the valve 23 and the pressurized air flows through the valve, through the bores 24 and 25, and between the bladder 11 and the surface of the body section 15. The bladder stretches and moves away from the surface of the body pushing the bars 12 outwardly as shown in FIG. 4. The outer surface of the bars are thus pressed against the inner surface of the roll core locking the bars to the core. The torque rings 14 lock the bars 12 against relative rotational motion with respect to the body 10 and the shaft to which the body is locked.

As the bars 12 move radially outwardly, they separate from each other. When the bars separate, the link members 34 present a smooth continuous surface to the bladder to prevent the bladder from being forced between the bars and damaged. The link members restrict the amount which adjacent bars can separate from each other. This limits the radial movement of the bars and prevents damage to the device from pressurization when a proper size core is not mounted on the device. The link members also strengthen the device by carrying the air pressure load directed toward the gap between bars and transmitting that load along the full length of the bars.

Figure 5:
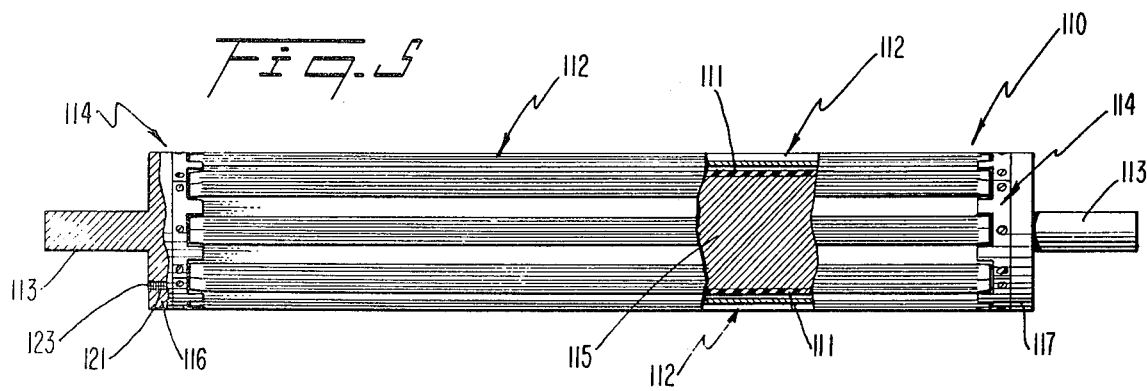
FIG. 5 is a side view of a second embodiment of the present invention.

Referring now to FIG. 5, there is shown an air shaft according to the present invention which is an elongated version of the air chuck shown in FIGS. 1 to 4 with an integral shaft. This embodiment includes a body 110, a bladder 111, a plurality of bars 112, and a pair of torque transmitting rings 114. The body 110 is solid and is formed with shaft portions 113 extending from the ends thereof and has a small diameter center section 115 which is greatly elongated with respect to the section 15 of the first embodiment. The body 110 has enlarged end sections 116 and 117 which are identical to the sections 16 and 17 of the first embodiment. The torque transmitting rings 114 are identical to the rings 14 of the first embodiment, and spring rings identical to the spring rings 41 of the first embodiment may be provided under the rings 114. The bars 112 and the bladder 111 are constructed in the same manner as are the bars 12 and the bladder 11 of FIGS. 1 to 4 except that they are elongated to the same extent as is the center section 115. The sealing arrangement between the section 115 and the bladder 111 is the same as that shown in FIGS. 1 to 4 with respect to the section 15 and the bladder 11. Link members (not shown) are provided to link the bars 112. They are constructed as are the link members 34 of the first embodiment except that they are elongated to the same extent as are the bars 112. A passageway 121 provided with a valve 123 admits air under pressure between the bladder 111 and the surface of the section 115 in the manner disclosed in connection with the first embodiment.

Alternately, an air shaft (not shown) can be provided which is essentially a series of air chucks arranged end to end. This can be accomplished by forming the body 110 with intermediate enlarged sections axially spaced between the end sections 116 and 117. These enlarged sections are of the same diameter as the end sections 116, 117 and carry torque transmitting rings on each edge. A plurality of core engaging bars are positioned between adjacent enlarged sections, and individual bladders are provided for each set of bars. An air passageway extends through the body parallel to the axis thereof with transverse passageways provided for each of the bladders. All of the parts of such an air shaft except for the body, are identical with the air chuck parts so that both air chucks and air shafts can be produced at minimum expense.

It can be seen from the foregoing that the present invention provides an improved expandable device for locking a core to a shaft element and also fulfills all of the other objects stated hereinabove.

As various changes may be made in form, construction, and arrangement of the parts herein, without departing from the spirit and scope of the invention and without sacrificing its advantages, it is to be understood that all matter herein is to be interpreted as illustrative and not in any limiting sense.

I claim:

1. In an expandable device for locking a bored member to a shaft element, the expandable device having a body provided with an annular surface and an annular single wall expandable bladder covering said annular surface, means for sealing the ends of said bladder to said surface comprising in combination a plurality of parallel circumferential ridges at each end of said annular surface, the ends of said bladder overlying said ridges, and a pair of discontinuous circular bands formed with interlocking ends each positioned over one end of said bladder and dimensioned to force said bladder against said ridges when said ends are interlocked, each end of each band being formed with a flat laterally extending hook element, the hook elements on opposite ends of each band having the same shape but facing in opposite directions to be complementary to each other and intermesh to provide a continuous band of uniform dimension throughout its circumference, each of said hook elements having a neck portion extending along one edge of the band and a head portion extending transversely from that edge more than half way across the band, said head portion having a load carrying surface angled to prevent lateral movement of the interlocked hook elements when said bladder is expanded.

2. Apparatus according to claim 1 wherein said bands are provided with an aperature adjacent to each hook element along the circumferential centerline of the band for receiving a band tensioning tool.

* * * * *